Sept. 11, 1928.
W. D. TIMMONS
1,683,934
CUTTING DIE
Filed April 23, 1926
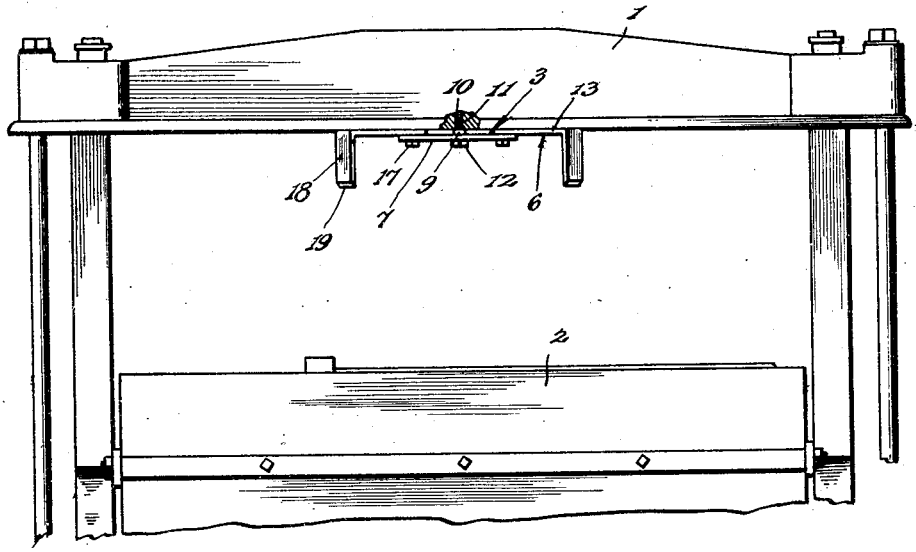
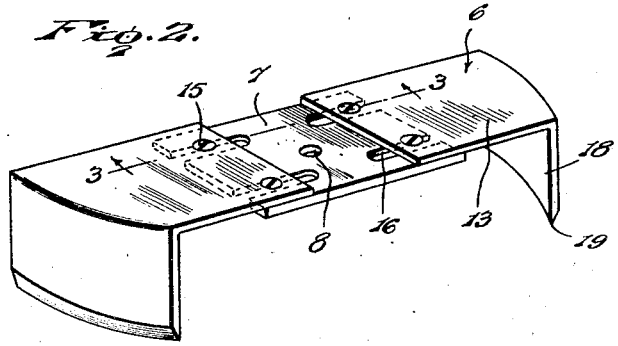
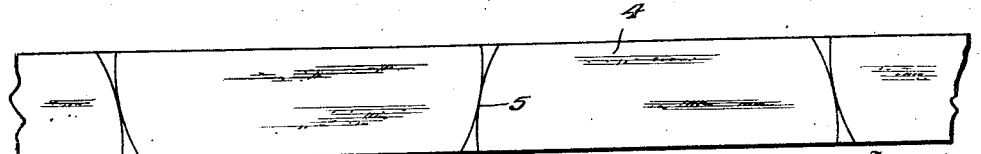
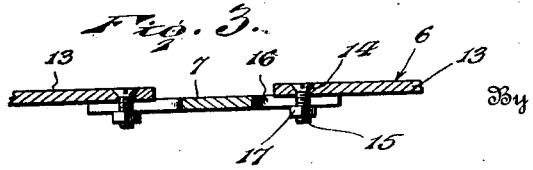
Inventor
W. D. Timmons.
By Lacey & Lacey, Attorneys Patented Sept. 11, 1928.

1,683,934

UNITED STATES PATENT OFFICE.

WILLIAM D. TIMMONS, OF COSHOCTON, OHIO.

CUTTING DIE.

Application filed April 23, 1926. Serial No. 104,174.

This invention relates to improvements in cutting dies and more particularly to a die for employment in cutting gauntlet cuffs from a strip of cloth or other material. As such cuffs must be wider at their rear ends than at their front ends where they are united marginally to the gauntlets, the end edges must be cut along non-parallel lines and heretofore there has been a considerable waste of material resulting from this cutting operation. Therefore, it is the primary object of the present invention to provide a cutting die by the use of which gauntlet cuffs or blanks may be cut from a strip of material without any appreciable waste.

One method of cutting gauntlet cuffs from a strip of material contemplates the employment of a cutting blade reciprocating at a high rate of speed but by this method complicated mechanism must be employed to move the blade or the material to effect the desired curvilinear cut. Therefore, it is another important object of the present invention to provide a cutting die which may be mounted upon the head of any die press of ordinary construction and which die will be so constructed that, in the operation of the press, and by rotating the die through one-half a revolution after each cutting operation, cuff blanks may be cut from a strip of material with accuracy and without any appreciable waste of the material.

Another object of the invention is to so construct the die that it may be readily adjusted to adapt it for cutting cuff blanks of different lengths.

In the accompanying drawings:

Figure 1 is a view in elevation illustrating the cutting die embodying the invention mounted upon the head of a die press of ordinary construction.

Figure 2 is a perspective view of the die.

Figure 3 is a detail vertical sectional view taken substantially on the line 3—3 of Figure 2, looking in the direction indicated by the arrows.

Figure 4 is a plan view illustrating schematically the manner in which gauntlet cuff blanks are cut from a strip of material by the use of the die embodying the invention.

In Figure 1 of the drawings, the numeral 1 indicates in general the head of a die press of ordinary construction and 2 the bed block upon which, in accordance with the present invention, a strip of cloth is placed to be operated upon by the die embodying the invention, it being understood, that, in practice, some means will be provided for feeding the cloth to the press as the press is operated. The die embodying the invention is indicated in general by the numeral 3 and the same is mounted, in a manner to be presently explained, upon the under side of the head 1 of the press and above the bed block 2.

Figure 3 of the drawings illustrates schematically the manner in which gauntlet cuff blanks are to be cut from a continuous strip of cloth, through the employment of the die of the present invention and in this figure, the numeral 4 indicates the blanks, each blank, when cut, being of a width equal to the width of the strip of cloth from which it is produced and having curvilinear end edges indicated by the numeral 5. These edges are curvilinear for the reason that one longitudinal edge of the blank must be longer than the other, which latter edge is to be stitched to the wrist portion of the gauntlet, the cuff being of greater dimensions at its unattached end than at its end which is attached to the gauntlet. Heretofore, as previously explained, difficulty has been experienced in cutting such blanks without a considerable waste of material and the die embodying the invention is designed and operated in a manner to obviate this waste.

The die comprises a pair of die members indicated in general by the numeral 6 and a supporting plate which is indicated by the numeral 7, and said plate is provided centrally with an opening 8 for the passage therethrough of the cylindrical shank of a supporting bolt indicated by the numeral 9, the bolt having a reduced threaded end 10 which is fitted into a threaded socket 11 formed in the under side of the head 1 of the press, the head 12 of the bolt serving to support the plate 7 so that it may be rotated. Each die member 6 comprises a head 13 which is flat and formed near its inner end with spaced openings 14 for the passage therethrough of bolts 15 which fit adjustably in slots 16 formed in the ends of the supporting plate 7, nuts 17 being threaded onto the bolts and tightened to bear against the under side of the said plate 7, it being understood that in this manner, the heads 13 of the die members 6 are adjustably secured upon the upper side of the said plate 7. The slots 16 in the plate 7 extend parallel to each other and it will be evident that by loosening the nuts 17, the die members 6 may be adjusted outwardly or inwardly so as to adapt the die to cut blanks of different lengths.

Each die member 6 further includes a blade 18 which is of arcuate form and extends downwardly from the outer end of the respective head 13, the lower edge of the blade being sharpened to provide a cutting edge indicated by the numeral 19. This edge 19 is of curvilinear form to produce the curvilinear end edges of the blanks and inasmuch as each blank is of greater length at one longitudinal edge than at the other, the cutting edges 19 are oppositely curved, that is to say, the cutting edges are eccentric to the pivotal center of the die or converge from one side of the die to the other side thereof.

In the operation of the press and following each cutting operation, the die is rotated through one hundred and eighty degrees so that, as the strip of cloth is fed over the surface of the bed block 2, the longer longitudinal edges of the blanks will be alternated as shown schematically in Figure 3 of the drawings, thereby effecting a considerable saving in the material.

It will be understood that the present invention is not concerned with the manner in which the strip of cloth is fed over the surface of the bed block 2, nor with any mechanical means which might be provided for automatically or otherwise rotating the die, the invention residing primarily in a rotatably supported or reversible die of the general construction illustrated and described.

It will also be understood that while the die illustrated and described is adjustable, the die may be considered as comprising a head, of which the member 13 and plate 7 constitute component parts, and blades extending from the head and having oppositely curved cutting edges, for if the adjustable feature is not desired, the members 13 might be integrally formed or they might be secured to the plate without the provision of means for adjustment.

Having thus described the invention, what I claim is:

1. A cutting die comprising a supporting plate, means for supporting the plate for rotative reversal, and blades having heads adjustably mounted upon the said plate, the lower edges of the blades constituting cutting edges and being oppositely curved.

2. A cutting die comprising a plate, means for supporting the plate for rotative reversal, the plate being provided with slots, cutting members comprising heads adjustably disposed upon the plate, blades depending therefrom and having oppositely curved cutting edges, and securing elements fitted through the said heads and through the slots in the plate and adjustably securing the heads to the plate.

3. A cutting die comprising a head, means for supporting the head for rotative reversal, and arcuate blades extending downwardly from the head eccentric to the center of rotation of the head and having their concave sides presented toward each other, the lower edges of the blades constituting their cutting edges.

In testimony whereof I affix my signature.

WILLIAM D. TIMMONS. [L. S.]